United States Patent Office 3,663,590
Patented May 16, 1972

3,663,590
NOVEL POLYHALOORGANO HALOSULFATES
Louis Gene Anello, Basking Ridge, and Richard Francis Sweeney, Dover, N.J., assignors to Allied Chemical Corporation, New York, N.Y.
No Drawing. Filed Apr. 23, 1969, Ser. No. 818,826
Int. Cl. C07c 143/68
U.S. Cl. 260—456 R         27 Claims

ABSTRACT OF THE DISCLOSURE

Halosulfates of the formula:

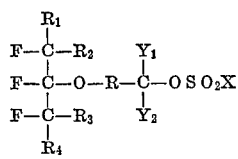

wherein $R_1$–$R_4$ are independently selected from the group consisting of F, Cl, alkyl and haloalkyl groups in which the halogen atoms are Cl or F; $R_1$ and $R_4$ when taken together and with the carbon chain therebetween form a cyclic structure, R is an alkylene or haloalkylene group in which the halogen atoms are selected from Cl and F, $Y_1$ is selected from H, F, Cl and perhaloalkyl groups in which the halogen atoms are selected from F and Cl, $Y_2$ is selected from F and Cl and X is selected from F and Cl; may be prepared by reacting a corresponding polyhaloorgano alkyl iodide with chlorosulfonic or fluorosulfonic acid as appropriate. The novel halosulfate products are useful as surfactants, oil, stain and water repellent agents and as intermediates to other valuable surface active agents.

CROSS REFERENCES TO RELATED APPLICATIONS (1) Co-pending application of Litt et al., entitled "Fluorinated Ethers," Ser. No. 492,276, filed Oct. 1, 1965, now U.S. Pat. No. 3,453,333.

(2) Co-pending application of Litt et al., entitled "Fluorinated Ethers," Ser. No. 513,574, filed Dec. 13, 1965, now U.S. Pat. No. 3,470,256.

(3) Co-pending application of Anello et al., entitled "Telomers and Process for the Preparation Thereof," Ser. No. 633,359, filed Apr. 25, 1967, now, U.S. Pat. No. 3,514,487.

(4) Co-pending application of Anello et al., entitled "Novel Telomers," Ser. No. 818,825, filed Apr. 23, 1969, now abandoned.

(5) Co-pending application of Anello et al., entitled "Fluorocarbon Compounds," Ser. No. 721,117, filed Apr. 12, 1968.

(6) Co-pending application of Anello et al., entitled "Fluorocarbon Acids and Derivatives," Ser. No. 721,115, filed Apr. 12, 1968.

BACKGROUND OF THE INVENTION

A variety of polyhalogenated alkyl chlorosulfates and fluorosulfates are known in the art to be useful in the production of surface active materials and in the production of oil, stain and water repellant agents. (See U.S. Pats. 3,255,228; 3,238,240 and 3,238,241.) The art is continually searching for new and improved surface active materials and oil, stain and water repellant agents with superior oil, stain and water repellancy and with superior durability.

It is a major object of this invention to provide a novel class of polyhaloorgano chlorosulfates and fluorosulfates useful in the preparation of superior surfactants and oil, stain and water repellant agents.

Other objects and advantages of the invention will become apparent from the following description.

SUMMARY OF THE INVENTION

We have discovered a novel class of polyhaloorgano chlorosulfates and fluorosulfates, sometimes hereinafter referred to as the "novel halosulfates," are useful as surfactants, and as oil, stain and water repellent agents and also as intermediates to other corresponding acids and salts which are highly superior oil, stain and water repellent agents and surfactants. These novel compounds may be represented by the general formula:

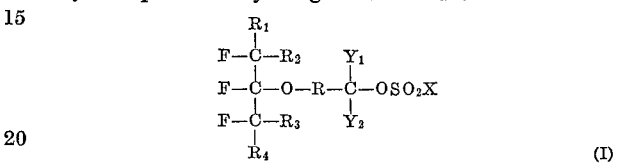

wherein $R_1$–$R_4$ are independently selected from the group consisting of F, Cl, alkyl and haloalkyl groups in which the halogen atoms are Cl or F, $R_1$–$R_4$ when taken together and with the carbon chain therebetween, form a cyclic structure, R is an alkylene or haloalkylene group in which the halogen atoms are selected from Cl and F, $Y_1$ is selected from H, F, Cl and perhaloalkyl groups in which the halogen atoms are selected from F and Cl; $Y_2$ is selected from F and Cl and X is selected from F and Cl.

The novel halosulfates are critically characterized by the particular structure of the tail portion of the molecule and its linkage to the remainder of the molecule. The tail portion is characterized by the presence of a carbon atom linking an oxygen atom and a fluorine atom, in combination with two haloalkyl linkages satisfying the remaining valences of the carbon atom linking the oxygen and fluorine atoms. The haloalkyl linkages are characterized by the presence of at least one fluorine atom on each carbon atom which is adjacent the carbon atom which links the oxygen and fluorine atoms.

DETAILED DESCRIPTION OF THE INVENTION AND OF THE PREFERRED EMBODIMENTS

The novel halosulfates may be prepared by reacting the corresponding polyhaloorgano alkyl iodide of the formula

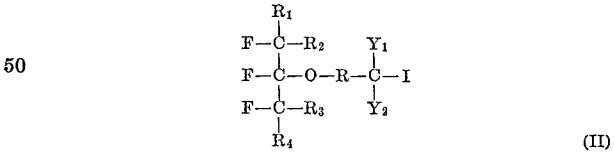

wherein $R_1$–$R_4$, R, $Y_1$, $Y_2$ and X are as defined above, with chlorosulfonic acid or fluorosulfonic acid as appropriate. The reaction may readily be carried out by merely heating the iodide starting material with the halosulfonic acid reactant at temperatures between about 100–300° C. and preferably at temperatures between about 150–250° C.

The molar ratio of the halosulfonic acid to the iodide reactant should be at least about 1:1 and preferably from about 2:1 to about 5:1. Large excesses of the halosulfonic reactant may be employed wihout deleteriously affecting the reaction.

The reaction is normally complete within about 1–50 hours and more usually within a period of about 2–18 hours.

The reaction pressure is not critical. The reaction may be carried out under atmospheric pressure or under super-atmospheric pressure. When the reactants are not volatile, the reaction is most conveniently carried out at atmospheric pressure. When the reactants are volatile, it is desirable to carry out the reaction in an autoclave so as to maintain the reactants in liquid phase.

Product recovery may be effected by simply separating the organic layer from the product mixture and subjecting the same to ordinary distillation.

The reaction techniques are essentially the same as described in U.S. Pats. 3,255,228; 3,238,240 and 3,238,241, mentioned supra.

The halosulfonic acid reactants are a known class of materials and are commercially available.

The polyhaloorgano alkyl iodide starting materials are the telogen and telomer products which are disclosed in co-pending applications Ser. Nos. 492,276; 513,574; 633,359 and 818,825 mentioned supra. Polyhaloorgano alkyl iodide starting materials of Formula II in which R contains a single carbon atom, are telogens which may be prepared by reacting an appropriate perhalogenated cyclic or acyclic ketone with an ionizable fluoride salt, e.g., KF, to form a fluorinated organic salt and then reacting the organic salt with a halogen other than fluorine (e.g., iodine or bromine) and an appropriate olefin, such as tetrafluoroethylene, in the presence of an inert organic solvent, to form the desired telogen. The reaction between the perhalogenated ketone with the ionizable fluoride salt proceeds readily at room temperature and is best carried out under anhydrous conditions in the presence of an inert organic solvent such as acetonitrile or dimethyl formamide. The reaction between the fluorinated organic salt with the olefin and a halogen also proceeds readily at room temperature and may be conducted in the same solvent medium as the first mentioned reaction. These reactions are more fully described in copending applications Ser. Nos. 492,276 and 513,574, mentioned supra.

The longer chain polyhaloorgano alkyl iodide starting materials, possessing an even number of carbon atoms linking the oxygen and iodine atoms, are telomers which may be prepared by telomerizing the telogens described above with a telomerizable unsaturated material comprising an olefin possessing only halogen and hydrogen substituentts.

The telogens may first be telomerized to a desired molecular weight with a first olefin and then the resulting telomer product may optionally be further telomerized to a higher molecular weight with an additional olefin or olefins. Preferably, the olefin or olefins reacted with the telogens are so chosen and the degree of telomerization is so adjusted that the R moiety possesses a ratio of halo atoms to hydrogen atoms of at least 1:1.

The telomerization reaction is carried out under free radical conditions. The free radicals are preferably produced with thermal initiation of the reaction and this is accomplished simply by heating the reactants to an elevated temperature. The elevated temperature should normally be between about 100° C. and 350° C., preferably between about 150° C.–200° C. Alternatively, conventional free radical generating catalysts may be employed to initiate the reaction. Although the reaction may be conducted at atmospheric pressure, superatmospheric pressures, for example, up to about 20,000 p.si.g. may be used with pressures between about 100 p.s.i.g. and about 10,000 p.s.i.g. being especially preferred. The chain length of the resulting product is influenced by the reaction period which may vary from about 10 minutes to about 2 weeks.

The ratio of telogen to olefin may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of olefin is maintained above the liquid phase comprising the telogen during the reaction, the molecular weight of telomer product may be controlled by varying the pressure of the olefin. In general, the higher the pressure of the olefin, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telomerization reaction is described in more detail in copending application Ser. No. 633,359, mentioned supra, and in corresponding Belgian Pat. 714,162.

Illustrative olefins suitable for telomerization include the following: $CF_2=CF_2$, $CF_2=CH_2$, $CF_2=CClF$,

$$CF_3CF=CF_2$$

$CH_2=CH_2$, $CCl_2=CH_2$, $CFH=CH_2$, $CClH=CH_2$, $CFH=CF_2$, $CFH=CFH$, $CClH=CClH$, $CF_2ClCF=CH_2$, $CF_3CH=CF_2$, $CF_3CCl=CF_2$, $(CF_3)_2C=CF_2$,

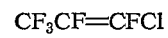
$$CF_3CF=CFCl$$

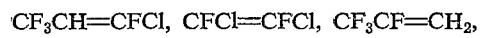
$CF_3CH=CFCl$, $CFCl=CFCl$, $CF_3CF=CH_2$,

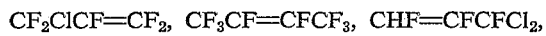
$CF_2ClCF=CF_2$, $CF_3CF=CFCF_3$, $CHF=CFCFCl_2$,

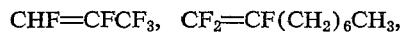
$CHF=CFCF_3$, $CF_2=CF(CH_2)_6CH_3$,

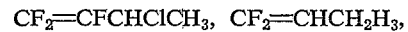
$CF_2=CFCHClCH_3$, $CF_2=CHCH_2H_3$,

$CF_2=CHCH_2CH_2Cl$, $CF_2=C(CF_3)CF_2(C_3H_7)$,

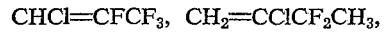
$CHCl=CFCF_3$, $CH_2=CClCF_2CH_3$,

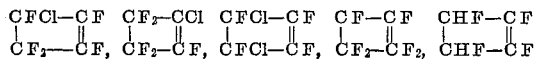

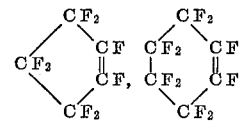

and $CH_2=C(C_2H_5)_2$. Many more suitable olefins will readily occur to one of ordinary skill in the art.

The longer chain polyhaloorgano alkyl iodide starting materials, possessing an odd number of carbon atoms linking the oxygen and iodine atoms, are telomers which may be prepared by the following procedure. A polyhaloorgano alkyl iodide telogen as defined by Formula II above, wherein the R group contains one carbon atom, is reaced with sulfur trioxide to form an acid halide. This reaction is carried out at temperatures between about 50–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodine atoms by the well known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins to produce telomer iodides having an odd number of carbon atoms linking the oxygen and iodine atoms. Illustrative procedures are shown as follows:

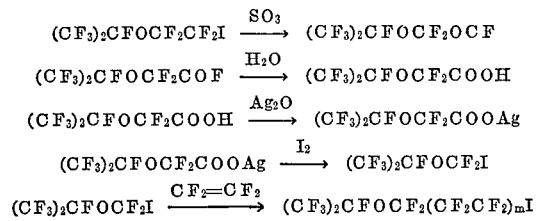

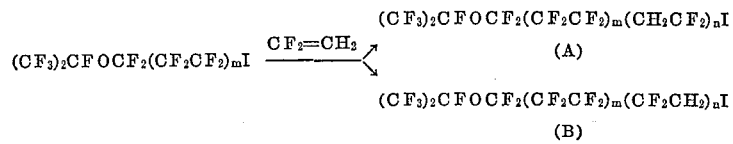

It should be noted that the above-noted telomerization reaction produces two products (A) and (B). The (A) product is obtained in about a 95% yield. The (B) product is obtained in about a 5% yield. The (A) and (B) products can be separated by conventional procedures. For example, dehydroiodinating the (A) and (B) product mixture with KOH at 75–150° C. preferentially converts product (A) to the corresponding olefin which can then be readily separated from product (B) by distillation.

Other methods can readily be devised by those skilled in the art for preparing suitable polyhaloorgano alkyl iodide starting materials.

With reference to Formula I for the novel halosulfates of the invention, $R_1$–$R_4$, if alkyl or haloalkyl groups may be straight chain or branched chain. There is no particular criticality as to the maximum number of carbon atoms in such groups. A preferred carbon content for such groups is from 1–9 carbon atoms and still preferred is from 1–2 carbon atoms, $R_1$–$R_4$ are preferably F, Cl or perhaloalkyl groups. Still preferably, any perhaloalkyl groups are perfluoroalkyl groups. When the $R_1$–$R_4$ groups contain chlorine substitution or hydrogen substitution, it is preferred that enough fluorine substitution be provided so that the atomic ratio of fluorine to chlorine atoms to the hydrogen atoms or to the combined total of the chlorine and hydrogen atoms, is at least 1:1. In the most preferred embodiment $R_1$–$R_4$ are all F.

There is no particular criticality for the carbon content of the R group in Formula I. Preferably, the R group contains 1–80 carbon atoms, still preferably from 1–40 carbon atoms and most preferably from 1–15 carbon atoms. When R contains chlorine substitution or hydrogen substitution, it is preferred that enough fluorine substitution be provided so that the atomic ratio of fluorine to chlorine atoms to hydrogen atoms, or to the combined total of the chlorine and hydrogen atoms, is at least 1:1. The R group is preferably a perhaloalkylene group and still preferably is a perfluoroalkylene group containing 1–15 carbon atoms. The R group is saturated and may be straight chain or branched chain, cyclic chain or a combination thereof.

In one embodiment R is a $(CH_2CF_2)_m$ group in which m is preferably 1–20 and still preferably 1–7.

When $Y_1$ is a perhaloalkyl group, $Y_1$ preferably contains 1–6 carbon atoms, and still preferably from 1–3 carbon atoms.

The novel halosulfates may be converted into valuable surfactants and oil, stain and water repellent agents by reactions with water, ammonia, amines, alcohols and mercaptans as described in U.S. Pats. 3,238,240; 3,238,241 and 3,255,228, mentioned supra. For example, the novel halosulfates are readily hydrolyzed to the corresponding acids by refluxing in water. Salts of the acids are readily prepared from the acids or directly from the halosulfates by reaction with an aqueous base. These salts exhibit high surface activity and may be used in the manner in which surfactants are conventionally employed, such as in the preparation of emulsions and surface coatings and to increase wettability such as in the dyeing of textile fabrics.

The novel halosulfates are also useful themselves as surfactants and as oil, stain and water repellent agents.

Specific examples of embodiments of the invention include the following:

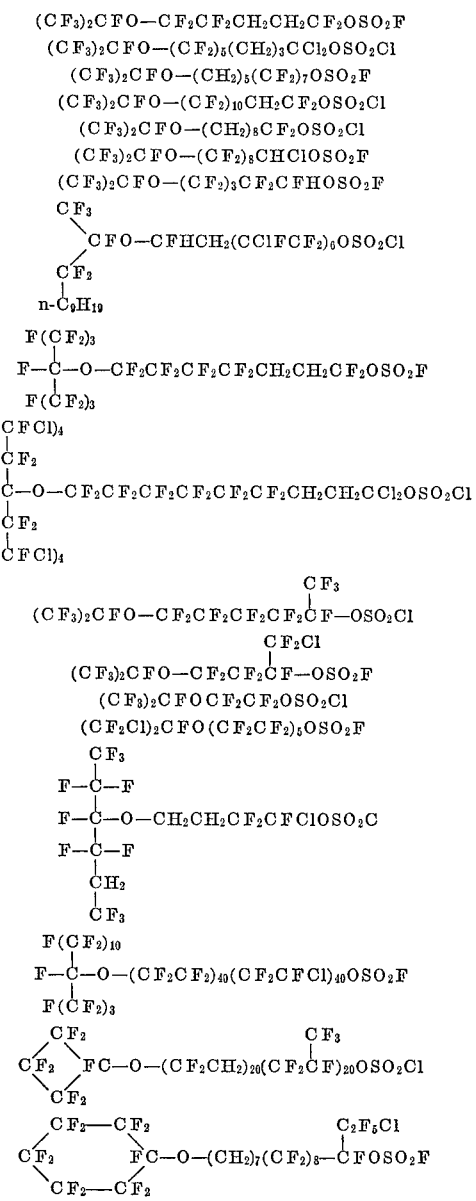

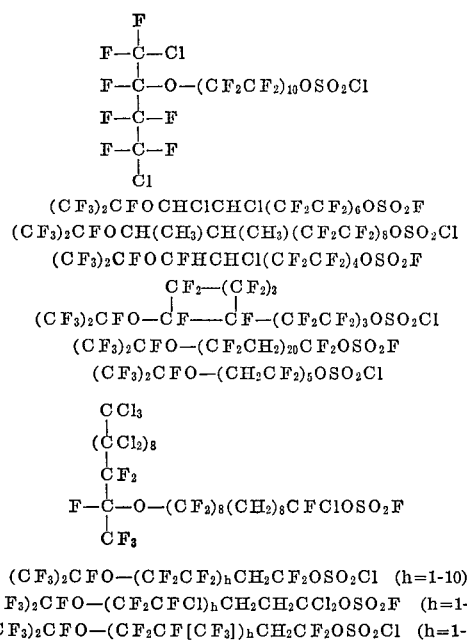

$(CF_3)_2CFOCHClCHCl(CF_2CF_2)_6OSO_2F$
$(CF_3)_2CFOCH(CH_3)CH(CH_3)(CF_2CF_2)_8OSO_2Cl$
$(CF_3)_2CFOCFHCHCl(CF_2CF_2)_4OSO_2F$

$(CF_3)_2CFO—(CF_2CH_2)_{20}CF_2OSO_2F$
$(CF_3)_2CFO—(CH_2CF_2)_5OSO_2Cl$

$(CF_3)_2CFO—(CF_2CF_2)_hCH_2CF_2OSO_2Cl$ (h=1-10)
$(CF_3)_2CFO—(CF_2CFCl)_hCH_2CH_2CCl_2OSO_2F$ (h=1-10)
$(CF_3)_2CFO—(CF_2CF[CF_3])_hCH_2CF_2OSO_2Cl$ (h=1-10)

The following examples provide a further description of the invention, it being understood that these examples are being given for purposes of illustration only and are not to be regarded as restricting the invention which is defined by a reasonable interpretation of the appended claims. Parts are by weight except as otherwise indicated.

EXAMPLE 1

A three-necked 100 ml. flask, equipped with a stirrer, thermometer and reflux condenser, was charged with 95 grams (0.186 mole) of $(CF_3)_2CFOCF_2CF_2CF_2CF_2I$ and 42 grams (0.362 mole) of chlorosulfonic acid. The resulting mixture was heated with stirring to 112° C. and maintained at that temperature for a period of 22 hours. At the end of this period the mixture was cooled, then poured into a separatory funnel and allowed to separate into two layers. The organic layer was distilled on a small spinning band column. There were collected 56.5 grams (0.11 mole) of unreacted $(CF_3)_2CFOCF_2CF_2CF_2CF_2I$ (B.P. 41°–44° C./25 mm.) and 21.5 grams (0.0425 mole) of a product identified as $(CF_3)_2CFOCF_2CF_2CF_2CF_2OSO_2Cl$ (B.P. 69°–70° C./25 mm.). Infrared spectrographic analysis of the product showed a chlorosulfate band at 6.9 microns.

Analysis for $C_7F_{15}ClO_4S$.—Calc'd (percent): C, 16.78; F, 56.94; Cl, 7.09; S, 6.39. Found (percent): C, 17.25; F, 57.14; Cl, 7.02; S, 6.32.

EXAMPLE 2

A three-necked 100 ml. flask, equipped with a stirrer, thermometer and reflux condenser, was charged with 44 grams (0.072 mole) of $(CF_3)_2CFOCF_2CF_2(CF_2CF_2)_2I$ The contents of the flask was heated to 145°–150° C. 20 grams (0.172 mole) of chlorosulfonic acid were slowly added while the temperature of the reaction mixture was maintained at 140° C. The mixture was then stirred and maintained at 140° C. for a period of six hours. At the end of this period the mixture was cooled, then poured into a separatory funnel and allowed to separate into two layers. The organic layer was distilled on a small spinning band column. There were collected 22 grams (0.036 mole) of unreacted $(CF_3)_2CFOCF_2CF_2(CF_2CF_2)_2I$ (B.P. 72°–77° C./25 mm.) and 6.8 grams (0.011 mole) of a product identified as $(CF_3)_2CFOCF_2CF_2(CF_2CF_2)_2OSO_2Cl$ (B.P. 92°–98° C./25 mm.). Infrared spectrographic analysis of the product showed a chlorosulfate band at 6.9 microns.

Analysis of $C_9F_{17}ClO_4S$.—Calculated (percent): C, 17.98; F, 60.11; S, 5.33; Cl, 5.91. Found (percent): C, 18.30; F, 59.65; S, 5.04; Cl, 5.72.

EXAMPLE 3

A three-necked 100 ml. flask, equipped as in the preceding examples, was charged with 79.5 grams (0.111 mole) of $(CF_3)_2CFOCF_2CF_2(CF_2CF_2)_3I$ and 24.5 grams (0.21 mole) of chlorosulfonic acid. The temperature of the flask contents was raised to 125° C. and stirring was carried out for a period of 20 hours. At the end of this period the mixture was cooled to room temperature, then poured into a separatory funnel and allowed to separate into two layers. The lower organic layer was then distilled. There were collected 12.5 grams (0.0176 mole) of unreacted $(CF_3)_2CFOCF_2CF_2(CF_2CF_2)_3I$ (B.P. 79°–82° C./10 mm.) and 55 grams (0.080 mole) of $(CF_3)_2CFOCF_2CF_2(CF_2CF_2)_3OSO_2Cl$ (B.P. 95°–100° C./10 mm.).

Analysis for $C_{11}F_{23}ClO_4S$.—Calculated (percent): C, 18.72; F, 62.10; S, 4.53; Cl, 5.03. Found (percent): C, 19.10; F, 61.75; S, 4.72; Cl, 4.89.

EXAMPLE 4

A 100 ml. Fisher and Porter aerosol compatibility tube, equipped with a pressure gauge and a Hoke stainless steel needle valve, was connected to a −78° C. trap and was charged with 50 grams (0.121 mole) of $(CF_3)_2CFOCF_2CF_2I$ and 34 grams (0.34 mole) of fluorosulfonic acid. The vessel was flushed with nitrogen and then sealed and heated to 138°–150° C. and maintained at that temperature for a period of 48 hours. The vessel was then cooled and vented to the −78° C. trap. The remaining two-phase system was separated and the organic phase distilled. There were collected 21.5 grams (0.052 mole) of unreacted $(CF_3)_2CFOCF_2CF_2I$ (B.P. 86°–87° C.), 25.5 grams (0.066 mole) of a product identified as $(CF_3)_2CFOCF_2CF_2OSO_2F$ (B.P. 94°–97° C.) and 10 grams of unreacted fluorosulfonic acid. Infrared spectrographic analysis of the fluorosulfate product showed a fluorosulfate band at 6.65 to 7.70 microns.

Analysis for $C_5F_{12}SO_4$.—Calculated (percent): C, 15.61; F, 59.18; S, 8.33. Found (percent): C, 16.54; F, 61.06; S, 8.22.

EXAMPLE 5

A 500 ml. three-necked flask was charged with 50 grams (0.081 mole) of $(CF_3)_2CFOCF_2CF_2(CF_2CF_2)_2I$ and 41 grams (0.41 mole) of fluorosulfonic acid. The mixture was then heated with stirring to 125° C. for 18 hours. The resulting mixture was cooled, then poured onto ice, and the organic layer separated and dried with sodium sulfate. The organic product was distilled on a small spinning band column. There were collected 26 grams of $(CF_3)_2CFOCF_2CF_2(CF_2CF_2)_2OSO_2F$ (B.P. 97° C./60 mm.). Infrared spectrographic analysis of the product showed a fluorosulfate band at 6.7 microns.

Analysis for $C_9F_{20}O_4S$.—Calculated (percent): C, 18.49; F, 65.07; S, 5.48. Found (percent): C, 19.15; F, 64.94; S, 5.68.

We claim:
1. Halosulfates of the formula:

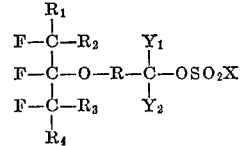

wherein $R_1$–$R_4$ are independently selected from the group consisting of F, Cl, alkyl and haloalkyl groups in which the halogen atoms are Cl or F, $R_1$ and $R_4$ when taken together and with the carbon chain therebetween, form a cyclic structure, R is an alkylene or haloalkylene group in which the halogen atoms are Cl or F, $Y_1$ is selected from the group consisting of H, F, Cl and perhaloalkyl groups in which the halogen atoms are F or Cl, $Y_2$ is F or Cl and X is F or Cl.

2. Halosulfates according to claim 1 wherein $R_1$–$R_4$ are selected from F, Cl and perhaloalkyl groups.

3. Halosulfates according to claim 2 wherein R is a haloalkylene group in which the halogen atoms are Cl or F and in which the atomic ratio of fluorine atoms to chlorine atoms or to hydrogen atoms or to the combined total of the chlorine and hydrogen atoms in the R group is at least 1:1.

4. Halosulfates according to claim 3 wherein X is Cl.

5. Halosulfates according to claim 3 wherein X is F.

6. Halosulfates according to claim 3 wherein $R_1$–$R_4$ are each F.

7. Halosulfates according to claim 6 wherein the R group contains from 1–40 carbon atoms.

8. Halosulfates according to claim 7 wherein the R group contains from 1–15 carbon atoms.

9. Halosulfates according to claim 8 wherein $Y_1$ and $Y_2$ are independently selected from the group consisting of F and Cl atoms.

10. Halosulfates according to claim 8 wherein $Y_1$ and $Y_2$ are each F atoms.

11. Halosulfates according to claim 8 wherein $Y_1$ and $Y_2$ are each Cl atoms.

12. Halosulfates according to claim 8 wherein $Y_1$ is a perhaloalkyl group containing 1–6 carbon atoms and $Y_2$ is F.

13. Halosulfates according to claim 12 wherein $Y_1$ is a perfluoroalkyl group.

14. Halosulfates according to claim 13 wherein $Y_1$ contains 1–3 carbon atoms.

15. Halosulfates according to claim 1 wherein R is a $(CH_2CF_2)_m$ group in which $m$ is an integer of from 1–20.

16. Halosulfates according to claim 15 wherein $m$ is an integer of from 1–7.

17. Halosulfates according to claim 9 wherein R is a perhaloalkylene group.

18. Halosulfates according to claim 17 wherein R is a perfluoroalkylene group.

19. Halosulfates according to claim 18 wherein R is a straight chain perfluoroalkylene group.

20. Halosulfates according to claim 19 in which $Y_1$ and $Y_2$ are both F.

21. Halosulfates according to claim 20 in which X is F.

22. Halosulfates according to claim 20 in which X is Cl.

23. A halosulfate according to claim 1 which is $$(CF_3)_2CFO(CF_2)_4OSO_2Cl$$

24. A halosulfate according to claim 1 which is $$(CF_3)_2CFO(CF_2)_6OSO_2Cl$$

25. A halosulfate according to claim 1 which is $$(CF_3)_2CFO(CF_2)_8OSO_2Cl$$

26. A halosulfate according to claim 1 which is $$(CF_3)_2CFO(CF_2)_2OSO_2F$$

27. A halosulfate according to claim 1 which is $$(CF_3)_2CFO(CF_2)_6OSO_2F$$

References Cited

UNITED STATES PATENTS

| | | | |
|---|---|---|---|
| 3,238,241 | 3/1966 | Hauptschein et al. | 260—456 R |
| 3,492,374 | 1/1970 | Le Bleu et al. | 260—456 R |
| 3,514,487 | 5/1970 | Anelo et al. | 260—458 |

LEON ZITVER, Primary Examiner

L. B. DeCRESCENTE, Assistant Examiner

U.S. Cl. X.R.

252—8.7, 353